T. K. CLARK.
METHOD OF FIXING RUBBER OR OTHER TIRES ON WHEELS.
APPLICATION FILED SEPT. 27, 1913.

1,083,975. Patented Jan. 6, 1914.
2 SHEETS—SHEET 1.

WITNESSES.
J. H. Siggers
E. L. Brown

INVENTOR,
Thomas K. Clark,
by C. G. Siggers
ATT'Y.

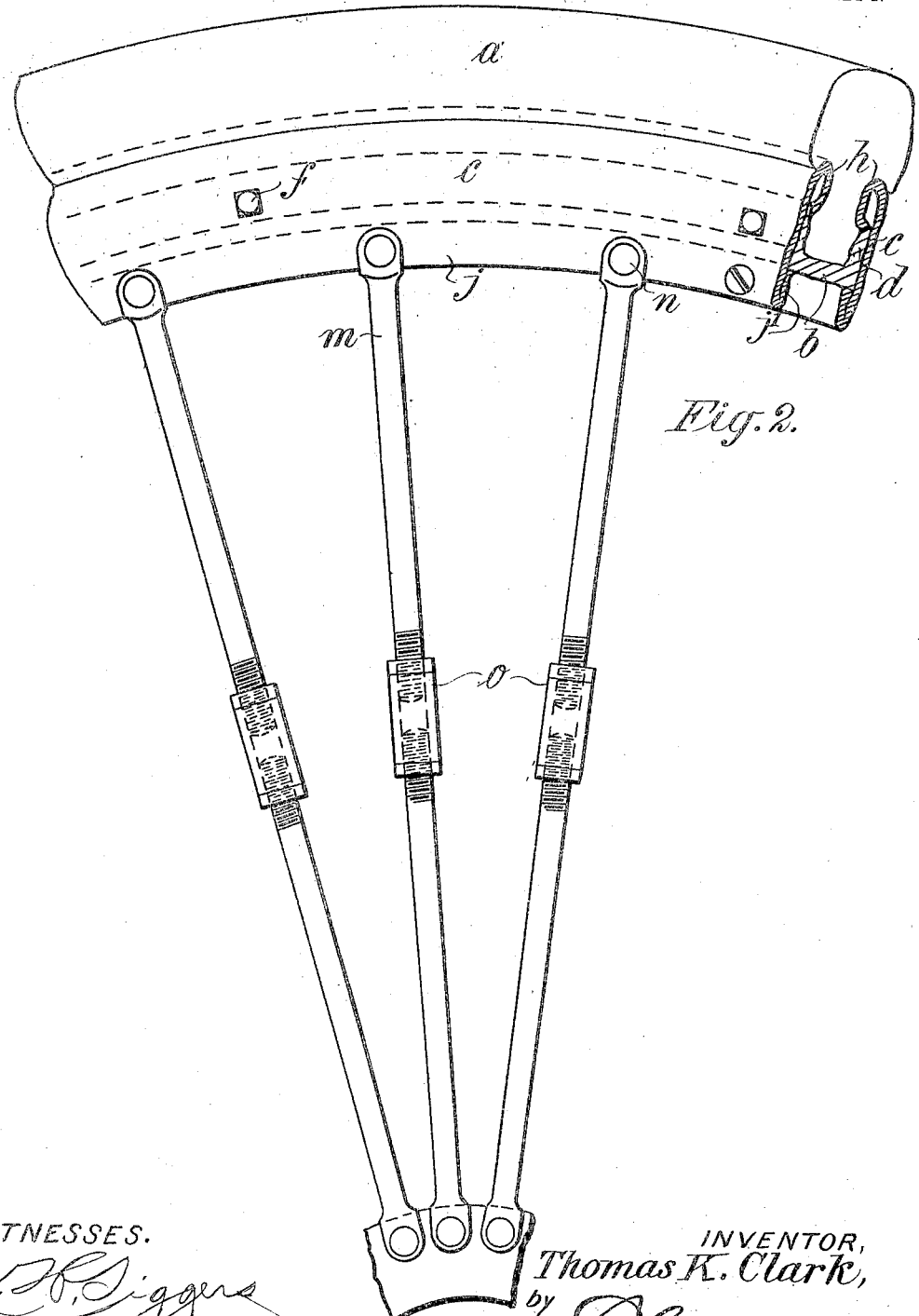

UNITED STATES PATENT OFFICE.

THOMAS KINMONTH CLARK, OF DURBAN, NATAL, SOUTH AFRICA.

METHOD OF FIXING RUBBER OR OTHER TIRES ON WHEELS.

1,083,875.  Specification of Letters Patent.  Patented Jan. 6, 1914.

Application filed September 27, 1913. Serial No. 792,239.

*To all whom it may concern:*

Be it known that I, THOMAS KINMONTH CLARK, a subject of His Majesty the King of England, residing at Durban, in the Province of Natal, South Africa, have invented a certain new and useful Improved Method of Fixing Rubber or other Tires on Wheels, of which the following is a specification.

This invention relates to automobile and other road-vehicle wheels, and has for its object to provide an improved method of fixing solid rubber or other tires thereon in such manner that they may be quickly and easily removed or replaced when worn or when otherwise desired.

It has heretofore been proposed to secure a solid rubber tire on a wheel felly by means of two annular side rings or flanges which are inwardly turned at their outer edges to grip the tire, are inwardly bent at their inner edges to engage under the inner periphery of the felly, and are bolted to the latter. It has also been proposed to provide a wheel in which a solid or pneumatic rubber tire is gripped between a rim formed in two annular half portions and serving as side rings or flanges, the outer edges of which rim rings are beaded and when the tire is solid engage in annular grooves formed in the sides of the same and to the inner edges of which rim rings the wire spokes of the wheel are secured.

Now according to the present invention a solid or other tire is mounted on a rim or channel and held in place thereon by means of two side rings or flanges detachably secured to the side flanges of said rim or channel and each formed in one or more sections, the outer edges of which rings are beaded to engage in annular grooves formed in the sides of the tire and to grip the outer edges of the side flanges of the rim or channel, and the inner edges of the rings are bent inwardly or doubled to engage the inner periphery of the rim or channel. Also, in the case of wire wheels having no wooden felly, the outer ends of the wire spokes are detachably bolted to the inwardly extended inner edges of the side rings.

The invention is hereinafter described with reference to the accompanying drawings in which:—

Figure 1:
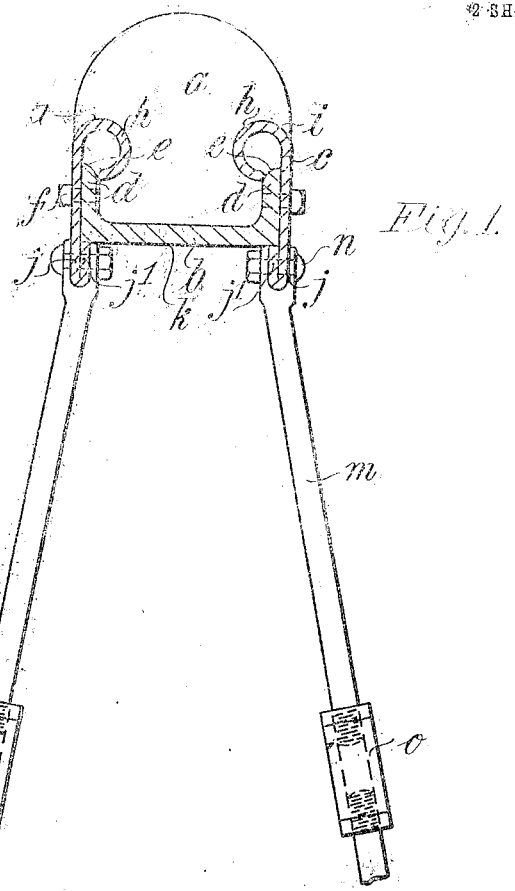
Figure 3:
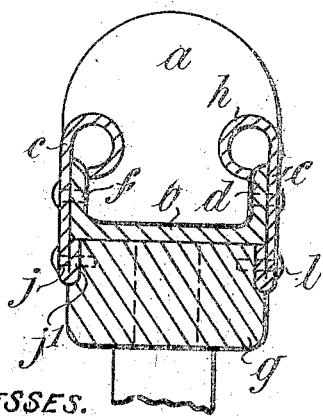
Figure 4:
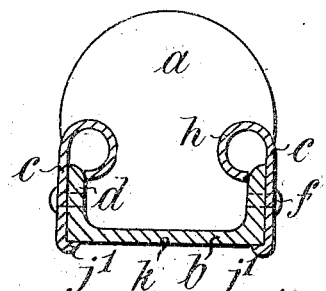

Figure 1 is a transverse sectional view of a portion of a wire wheel showing the invention applied thereto, and Fig. 2 is a side elevational view of Fig. 1; Figs. 3 and 4 are transverse sectional detail views showing the invention applied to a wheel having a wooden felly and to a metal wheel respectively.

According to the invention the tire *a* is held in place on the rim or channel *b* by means of two side rings or flanges *c*, said rings being locked in place by the side flanges *d* of the rim engaging in annular grooves or recesses *e* therein. Further security is provided by suitable screws or bolts *f* which bind the rings to the side flanges *d* of the wheel rim or channel *b*. These side rings may vary in size and strength according as they are to be used on the wheels of heavy or light vehicles, but the method and principle involved in securing them in place would be the same in all cases. The outer edges of the side flanges *c* where they come in contact with the tire are turned over inwardly at *h*, after the manner of enlarged beaded edges or ribs so as to engage in annular grooves *i* molded in the sides of the tire. The side flanges *c* are themselves extended or flanged at *j* along their inner circumferential edges and these flanges thereon are bent back or doubled at *j'* and adapted to engage the inner faces *k* of the rim or channel of the wheel. In the case of a wheel having a wooden felly *g* the flanges *j* are secured thereto by the bolts *l*, Fig. 3. The spokes *m* in the case of wire wheels are coupled to the side flange projections *j* so that they can, by means of suitable fastening bolts *n*, be coupled or uncoupled at pleasure without interfering with the tire. The inner ends of such spokes may be suitably bolted to a pair of disks secured centrally to the hub of the wheel, or otherwise secured to the hub and an adjustable coupling sleeve *o* provided near the middle of each spoke would allow for contraction and expansion as desired. The bent or doubled portions *j'* of the side rings serve to indicate when the rings are in correct position on the wheel. When the side flanges *c* are each formed in one piece they are sufficiently flexible to allow them to be sprung into place on the rim *b* or to be removed therefrom.

What I claim as my invention and desire to secure by Letters Patent of the United States is:—

1. A wheel including a U-shaped channeled rim, a tire fitting in the rim and provided beyond the same with side grooves, side plates attached to the sides of the channeled rim and extending beyond the same in both directions, said side plates being provided with beaded outer edges to fit in the grooves of the tire, the inner edges of the side plates being extended into the plane of the rim and engaging the inner periphery thereof.

2. A wheel including a U-shaped channeled rim, a tire fitting in the rim and provided beyond the same with side grooves, side plates attached to the sides of the channeled rim and extending beyond the same in both directions, said side plates being provided with beaded outer edges to fit in the grooves of the tire, the inner edges being doubled back upon themselves and engaging beneath the channeled rim.

In testimony whereof I affix my signature in presence of two witnesses.

THOMAS KINMONTH CLARK.

Witnesses:
RALPH M. ODELL,
LOUIS ED. SERRINGS.